UNITED STATES PATENT OFFICE.

FRITZ LAARMANN, OF DRESDEN, GERMANY.

PROCESS OF MANUFACTURING AN ELASTIC FOAM FROM VOLATILE SOLUTIONS.

1,089,482.   Specification of Letters Patent.   Patented Mar. 10, 1914.

No Drawing.   Application filed June 21, 1909.   Serial No. 503,533.

*To all whom it may concern:*

Be it known that I, FRITZ LAARMANN, a subject of the Emperor of Germany, residing at Dresden, Germany, have invented a Process of Manufacturing an Elastic Foam from Volatile Solutions, of which the following is a specification.

This invention relates to a process for manufacturing an elastic foam from a solution of an elastic material such as rubber, cellulose or the like.

Processes for the manufacture of elastic filling materials for tires, cushions and the like, possessed of elastic properties somewhat like those of compressed gases, are described in United States Patents Nos. 753,206, 753,300, and 857,960, French Patent No. 329,117, and German Patent No. 174,001. All of these processes aim at the production of an elastic foam by transforming into foam, while in a hot fluid condition, certain substances which, at the ordinary temperature, have a gelatinous, elastic consistency, either through beating, shaking or submitting them to centrifugal action, or through the injection of gas (as in French Patent No. 329,117) under the ordinary atmospheric or a higher pressure, mechanically, or by the admixture of some gas delivering substance,—and then, bringing them back by cooling to their gelatinous condition. In conjunction with some of these processes, methods are devised to make it impossible, through some chemical modification of the substance, for the latter to return to the fluid condition under the influence of heat. With all these processes, in order to obtain the hot fluid condition, it is necessary to operate on the original substance, which will be made insoluble later on, while it is in solution in a dissolving medium. Generally either glue, gelatin or albumin is used as the original substance, which is made insoluble through a tanning process usually applied during the foam producing operation, and as dissolving medium glycerin, sugar or alcohol is used, and sometimes also a small proportion of water, which however is in general difficult to remove from the gelatin and glycerin. These processes have however the considerable drawback that it is not possible to obtain complete insolubility of the material, especially in water, for, with the prior methods the dissolving medium must not be completely removed as it gives the original substance the elasticity required for the purpose in view, but it cannot be made insoluble itself. The process of rendering insoluble extends therefore to the original substance only, and not to the dissolving medium. The presence of this dissolving medium causes the material, if brought in contact with any solvent, and in spite of the complete insolubility of the original substance, to expand by absorption and to soften under the influence of heat. Another great drawback of these processes consists in the fact that the original substance, through the very process of making it insoluble, naturally loses its ability to remain in solution, and the dissolving medium, especially under the prolonged influence of heat, separates itself, whereby the foam structure is gradually destroyed.

Processes for the manufacture of rubber sponges have also been proposed, according to which a rubber solution is heated and the spongy form produced through the raising of the solution caused by the dissolving medium itself escaping in gaseous form, and consequently without any mechanical treatment. By means of such a process it is only possible to produce a spongy structure, but not a stable foam, *i. e.*, a cellular aggregate each cell of which is a gas-tight compartment partitioned off from the surrounding ones, and made permanently elastic by the imprisoned gas, the vapors developed by the dissolving medium, when used to raise the foam, being condensed again with the cooling of the solution.

The subject of the present invention is a process which overcomes the above mentioned drawbacks. According to this new process in which the original substance is operated upon, for the formation and fixation of the foam-structure, in a solution, and either by mechanical means or through some gas delivering substance, a foam is produced the cells of which are filled with gas, but, in order to make the elastic material completely unsoakable and insoluble, the dissolving medium is removed directly after the foam-structure has been produced or actually fixed. After desiccation, the foam constitutes therefore a gas-tight, insoluble and extremely light and elastic envelop on account of the gas imprisoned therein. The main advantage of such a cellular aggregate is that when severely injured, it allows the imprisoned gas to escape only as far as the destruction of the cells extends, while the remaining portion retains its gas and consequently its tension and elasticity. Such cellular aggregates are therefore highly valuable especially for air filled tires.

For the application of this process and in order to take the best advantage of the elasticity of the gas contained in the cells, a suitable material is chosen which, after the removal of the dissolving medium, possesses by itself the highest possible degree of elasticity. Of all substances known at the present day, the only such material is rubber. For the process in question however, the use of some other less elastic substance, such as cellulose, for instance, in a volatile dissolving medium, is by no means precluded. It is generally necessary to use a solvent which is sufficiently volatile to evaporate at temperatures at which the original substance is not yet affected.

Below are given some of the materials employable for this process with their solvents:

| Material. | Solvents. |
|---|---|
| Rubber | Petrol, benzolin, carbon bisulfid. |
| Cellulose tetra nitrate | Mixture of alcohol and ether. |
| Nitrocellulose with camphor | Mixture of alcohol and ether. |
| Cellulose acetate | Chloroform. |

The process is carried out in the following manner, when rubber is used as original substance:—A fairly consistent rubber solution of from 10 to 15%, according to the quality of the rubber, is poured into a gas-tight vessel, the latter is hermetically closed, and a gas is forced under pressure into the remaining space occupied by air. In this process, the pressure employed will be according to the kind of foam required and also according to the quality of the rubber, under ordinary circumstances, from 20 to 40 atmospheres (295 to 590 pounds per square inch) being sufficient, but pressures reaching up to about 200 atmospheres may be used. Hereupon, by means of a beating or stirring apparatus previously fitted in the vessel and worked by mechanism entering the said vessel with air-tight joint, the rubber solution is transformed into foam, and the compressed gas fills and is thus imprisoned in the foam cells. Many contrivances can be used for this purpose, the kind of apparatus and the method of producing the foam under a high pressure forming no part of the present invention. The foam-structure can also be obtained by the already known methods of inflation by means of gas delivering substances. For fixing the foam thus obtained, by vulcanization of the rubber contained in the solution, the following methods are available: The rubber solution, before being worked into foam, is mixed with a solution of sulfur monochlorid, whereby the vulcanization already starts during the foam-producing process. This method is not particularly advantageous, as the solution begins to harden already during the foam-producing operation, and this interferes with the foam formation, which requires, during its progress, the greatest possible uniformity in the consistency of the mass. To obtain cold vulcanization, it is preferable, after the foam has been raised, to inject the cold-vulcanizing solution into the already produced foam by means of an injector especially made for the purpose, and to distribute it thoroughly through the mass of foam with the mixing apparatus. The best proportion of pure sulfur monochlorid to use is about 5% of the weight of the rubber, which, however, in order to prevent it from acting too suddenly on the rubber, must be diluted, according to the weight, into at least a 10% solution by means of a suitable solvent, such as, for instance, bisulfid of carbon. Instead of a solution, there may be injected into the mass of foam and to be distributed through it by means of the mixing apparatus, a certain quantity of sulfur monochlorid in gaseous form, which does not affect the rubber too quickly.

With both methods of cold vulcanization, the rubber solution used must be free from any additions capable of causing secondary reactions with the sulfur monochlorid,—such as red oxid of lead, litharge, oxid of zinc or hydrate of calcium,—so as not to spoil the quality of the foam thus obtained. The foam, thus fixed by vulcanization, is now shaped to any form required for its subsequent use. By means of a feed pipe connected with the vessel, it may be fed into molds: canvas bags for cushions, canvas tubes of appropriate shapes for wheel tires, or directly into the said tires. For this operation the foam must not have too high a tension, as it would cause the molds to burst. The tension of the foam should therefore be reduced before the latter is fed out, by allowing the free gas remaining in the vessel to escape until the foam completely fills the vessel. By this means and on being fed out, the foam expands to at least several times the volume it had assumed in the vessel during the foam producing process. By reason of this expansion, it is possible, by proper choice of the pressure under which the material is worked into foam, to produce a foam of any desired degree of lightness. The fixation of the foam by vulcanization imparts to it sufficient strength to endure the expansion as well as its passage through the feed pipe, and, as the dissolving medium has not been removed yet, the foam has also enough viscosity to pass through the pipe without adhering thereto and choking up the passage.

As soon as the molds, bags or tubes, have been filled with the mass, the removal of the dissolving medium,—benzin, benzole, bisulfid of carbon or other suitable solvent,— may be proceeded with. This is effected by submitting the material to the prolonged action of gradually increased heat in the form of hot air or steam. By this means the foam is dried without injury to its cellular structure, the outermost films being first dried and then absorbing the dissolving medium, which escapes in the form of vapor from the innermost and still moist cells, and so on until the whole medium has been evaporated. This process is accomplished, if the heat is not applied too quickly, without injury to the cell films, and affects the whole mass throughout until the foam is completely dry. In case the foam is fed directly into its final envelop, it is of course necessary, in view of the drying process, that this envelop should be made sufficiently porous.

When the foam is filled with gas at a higher pressure than the atmospheric pressure, if dried under the ordinary pressure, the result would be that the gas contents of the cells would permeate the still moist cell films and escape and consequently the collapse of the whole cell aggregate would ensue in a short time. It is possible to counteract this destructive effect by opposing to the inner pressure of the imprisoned gas, throughout the process of desiccation, an equivalent pressure from outside, thus relieving the cell films from any pressure exerted on them, so that the foam, (or the objects filled therewith,) is dried under the same pressure as that possessed by the gas contents of the cellular mass. This can be done by means of a steam vulcanizing oven of well known construction. It is however necessary, if the tension of the gas imprisoned in the cells exceeds a certain point, that the outside counter-pressure shall not be produced solely by steam, as the rubber would be injured by being overheated. In such case, part of the pressure should be produced by means of compressed air, and what pressure is still required to balance the pressure of the gas contained in the foam, by means of steam.

If it is intended to fix the foam-structure by hot vulcanization, then the vulcanizing medium, in the form of pure sulfur, is mixed with the rubber solution previous to the foam raising process. In this case, the fixing cannot be effected before the drying. In consequence, it is necessary to take a more consistent solution in order to obtain the required degree of firmness to enable the foam to be fed out, and to proceed very cautiously with the drying. If the gas contained in the cells is under pressure, the hot vulcanization must also be carried out under counter-pressure, for the cell films soften again at the vulcanizing temperature. The drying and vulcanizing processes may be carried out in one uninterrupted operation, provided the material is first dried at a lower temperature. When this is completed, the tension of the steam may be increased up to the vulcanizing temperature. When hot vulcanization is resorted to, the solution may contain additional substances, so long as they do not affect the homogeneity and foam forming qualities of the solution.

In order to avoid oxidation of the rubber by the oxygen contained in the air used to inflate it, it is best to use the chemically inactive gas nitrogen instead of air for filling up the foam. This is even an advantage in the case of foam containing gas at a higher pressure than the atmospheric pressure, as of all known gases nitrogen is the least diffusible through rubber. Moreover, by its use the risk of explosion during the foam raising process is obviated, while when air is used there is always the possibility of an explosive mixture of gases being formed.

The new process can also be used for the manufacture of very light rubber sponges. In this case the cell-structure must be transformed into a net or tubular structure. This may be accomplished by various methods, for instance, through very strong expansion after fixation of the foam, so as to cause the cell films to burst at their center, where the tension is the greatest, while they remain intact at the junction points of two or more films. This can be attained by allowing the foam either to expand to the ordinary pressure after being filled with gas under high pressure, or to expand in vacuum after being filled under the ordinary pressure. This bursting can also be produced through rapid heating in the drying process, so that the rupture of the films is caused by the rapid vaporization of the dissolving medium, or it may be brought about by mechanically piercing the foam in a number of places.

The foam mass obtained by the above described process, owing to its high degree of elasticity due to the imprisoned gas, to its gas-tightness and to its insolubility in water, may be used for many purposes for which the foam materials heretofore produced are unsuitable: e. g. as an elastic filling for tires, cushions, buffers, as a filling stuff for swimming and life-belts and buoyant apparel, as a stuffing for elastic ships' fenders, as a filling for elastic balls, saddles, for the double compartments of ships to stop leakages automatically, as a light insulating envelop for electric conductors. in which case the gas contained in the foam constitutes an excellent insulator, as a heat insulating material for the most varied purposes, etc., etc.

What I claim is:—

1. The hereindescribed process of manufacturing an elastic foam from a solution of an elastic material, comprising the placing of the solution in an air tight vessel, hermetically closing said vessel, turning the contained solution into a substantive foam, thereupon fixing it in that condition by bringing a vulcanizing agent into contact and intimately mixing it with the already actually produced foam, and finally opening the vessel and evaporating the dissolving medium.

2. The hereindescribed process of manufacturing an elastic foam from a solution of an elastic material, comprising the placing of the solution in an air tight vessel, hermetically closing said vessel, turning the contained solution into a foam, fixing it in that condition by cold vulcanization by forcing sulfur monochlorid, in gaseous form, into the solution and finally opening the vessel and evaporating the dissolving medium.

3. The herein described process of manufacturing an elastic foam from a solution of an elastic material, comprising the placing of the solution in an air tight vessel, hermetically closing said vessel, working pure nitrogen into the solution to prevent after oxidation of the foam, turning the contained solution into a foam, fixing it in that condition, and finally opening the vessel and evaporating the dissolving medium.

4. The herein described process of manufacturing an elastic foam from a solution of an elastic material, comprising the placing of the solution in an air tight vessel, hermetically closing the latter, turning the contained solution into a foam, by adding gas delivering substances, fixing it in that condition running off the contents of the vessel and evaporating the dissolving medium, the evaporation being carried on under a counter pressure from the outside equal to the inside pressure, to counteract the destructive action of the gas contained in the cells of the foam.

5. The hereindescribed process of manufacturing an elastic foam from a solution of an elastic material, comprising the placing of the solution in an air tight vessel, hermetically closing said vessel, forcing a compressed gas into the space in the vessel not occupied by the solution, stirring the solution into a foam whereby the bubbles are filled with the gas, fixing the foam by vulcanization, allowing the fixed foam to expand and fill the vessel, while permitting the free gas to escape, pouring the substance into molds, and removing the dissolving medium.

6. The hereindescribed process of manufacturing an elastic foam from a solution of an elastic material, comprising the placing of the solution in an air tight vessel, hermetically closing said vessel, forcing a compressed gas into the space in the vessel not occupied by the solution, stirring the solution into a foam whereby the bubbles are filled with the gas, fixing the foam by vulcanization, allowing the fixed foam to expand and fill the vessel, allowing the free gas to escape, pouring the substance into molds, and removing the dissolving medium by prolonged action of gradually increasing heat.

7. The herein described process of manufacturing an elastic foam from a solution of an elastic material, comprising the placing of the solution in an air tight vessel, hermetically closing said vessel, forcing a compressed gas, having a greater than atmospheric pressure, into the space in the vessel not occupied by the solution, stirring the solution into a foam whereby the bubbles are filled with the gas, fixing the foam by vulcanization while subject to outside pressure equal to the inner pressure, allowing the fixed foam to expand and fill the vessel, allowing the free gas to escape, pouring the substance into molds, and removing the dissolving medium.

In testimony whereof I have hereunto set my hand in presence of two subscribing witnesses.

FRITZ LAARMANN.

Witnesses:
 PAUL ARRAS,
 CLÄRE SIMON.